US012697945B1

(12) United States Patent
Ramirez et al.

(10) Patent No.: US 12,697,945 B1
(45) Date of Patent: Aug. 4, 2026

(54) TIRE TRACTION WITH A BRAKE SYSTEM FOR FROZEN AND WET PAVEMENT

(71) Applicants: Abdiel Ramirez, Boca Raton, FL (US); Lidia Palacios-Ramirez, Boca Raton, FL (US); Valentina Rose Ramirez, Boca Raton, FL (US)

(72) Inventors: Abdiel Ramirez, Boca Raton, FL (US); Lidia Palacios-Ramirez, Boca Raton, FL (US); Valentina Rose Ramirez, Boca Raton, FL (US)

( * ) Notice: Subject to any disclaimer, the term of this patent is extended or adjusted under 35 U.S.C. 154(b) by 413 days.

(21) Appl. No.: 18/203,007

(22) Filed: May 29, 2023

(51) Int. Cl.
 B60T 1/14 (2006.01)
 B60Q 5/00 (2006.01)
 (Continued)

(52) U.S. Cl.
 CPC ............... B60T 1/14 (2013.01); B60Q 5/005 (2013.01); B60Q 9/00 (2013.01); B60T 7/22 (2013.01);
 (Continued)

(58) Field of Classification Search
 CPC .......... B60T 7/12; B60T 3/00; B60T 2201/06; B60T 2210/32; B60T 2230/00;
 (Continued)

(56) References Cited

U.S. PATENT DOCUMENTS 3,415,537 A * 12/1968 Goggins ................. B60B 39/00
 291/1
3,703,223 A * 11/1972 McInnes .................. B60T 1/14
 188/80
(Continued)

FOREIGN PATENT DOCUMENTS

| CN | 206127967 U | * | 4/2017 | |
|---|---|---|---|---|
| DE | 3812361 A1 | * | 9/1989 | ............... B60Q 7/00 |
| WO | WO-2010039017 A2 | * | 4/2010 | ................ B60T 7/12 |

OTHER PUBLICATIONS

Liu et al., Broken ice melting snow of well low-speed maglev cleans machine people, Apr. 26, 2017; EPO, CN 206127967 U, Machine Translation of Description (Year: 2017).*

(Continued)

*Primary Examiner* — James A English
(74) *Attorney, Agent, or Firm* — Sanchelima & Associates, P.A.; Christian Sanchelima; Jesus Sanchelima

(57) ABSTRACT

A tire traction with a brake system for frozen and wet pavement including an anti-slip assembly, a tire traction assembly, and an electronic assembly. Anti-slip assembly includes linear motion mechanisms coupled near to the vehicle's wheels, the mechanisms when deployed abuts against the frozen pavement, preventing the vehicle from slipping in an inclined street during black ice. Tire traction assembly includes a deployable mechanism with a set of wheels covered by a set of crawler belts, wherein traction peaks attached across the set of crawler belts allows the vehicle to improve traction when driving over frozen pavement. Electronic assembly includes a plurality of sensors that allows the anti-slip assembly and the tire traction assembly to be deployed and undeployed automatically, also an alarm is actuated to notify the user when a sensor has detected and activated one or both assemblies.

2 Claims, 7 Drawing Sheets

(51) Int. Cl.

| | |
|---|---|
| *B60Q 9/00* | (2006.01) |
| *B60T 7/22* | (2006.01) |
| *B62D 55/02* | (2006.01) |
| *B62D 55/084* | (2006.01) |
| *B62D 55/088* | (2006.01) |
| *B62D 55/10* | (2006.01) |

(52) U.S. Cl.
CPC ........... *B62D 55/02* (2013.01); *B62D 55/084* (2013.01); *B62D 55/088* (2013.01); *B62D 55/10* (2013.01); *B60T 2201/06* (2013.01); *B60T 2210/32* (2013.01); *B60T 2230/00* (2013.01)

(58) Field of Classification Search
CPC ........ B60Q 5/005; B60Q 9/00; B62D 55/084; B62D 55/088; B62D 55/10
USPC ...................................... 280/757; 180/5, 6, 7
See application file for complete search history.

(56) References Cited

U.S. PATENT DOCUMENTS

| | | | | |
|---|---|---|---|---|
| 4,274,656 | A * | 6/1981 | Warren | B60B 39/00 |
| | | | | 280/767 |
| 4,613,015 | A * | 9/1986 | Skrzypek | B60T 1/14 |
| | | | | 188/6 |
| 5,752,587 | A * | 5/1998 | Darling | B60T 1/14 |
| | | | | 280/767 |
| 6,220,397 | B1 * | 4/2001 | Beng | B60B 39/00 |
| | | | | 303/3 |
| 10,427,470 | B2 | 10/2019 | Lundgren et al. | |
| 10,661,606 | B2 | 5/2020 | McCarthy et al. | |
| 12,202,450 | B2 * | 1/2025 | Ratner | F16D 63/008 |

OTHER PUBLICATIONS

Rossmann Viktor, Safety wheel chock of smaller dimension for motor trucks and passenger vehicles, Sep. 7, 1989; EPO, DE 38 12 361 A1, Machine Translation of Description (Year: 1989).*

Berechelea Anatoli, Motor Vehicle Braking System, Apr. 8, 2010; USPTO, WO 2010-039017 A2, Machine Translation of Description (Year: 2010).*

* cited by examiner

TIRE TRACTION WITH A BRAKE SYSTEM FOR FROZEN AND WET PAVEMENT

FIELD OF THE INVENTION

The present invention relates to brake system and, more particularly, to a tire traction with a brake system for frozen and wet pavement that includes a set of oval tires with peaks that enhances traction when pavement is frozen, wherein a brake system is deployed from the bottom side of a vehicle to prevent the tires from sliding along the frozen surface.

DESCRIPTION OF THE RELATED ART

Several designs for tire tractions with a brake system for frozen and wet pavement have been designed in the past. None of them, however, include a set of oval tires used to enhance adhesion onto a frozen or wet pavement, wherein a brake system is deployed from the bottom side of a vehicle allowing it to stop or preventing it from sliding when frozen pavement.

Applicant believes that a related reference corresponds to U.S. Pat. No. 10,661,606 issued for vehicle recovery ladder. Applicant believes that another related reference corresponds to U.S. Pat. No. 10,427,470 issued for tire traction element. None of these references, however, teach of a tire traction with a brake system, wherein the oval tires with an anti-slip track are installed to a vehicle and a brake system is deployed from the bottom of the vehicle to prevent sliding due to pavement frozen surface.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system that helps a vehicle to be held in place on inclined streets.

It is another object of this invention to provide a traction device that enhances a vehicles' adhesion to the road when surface frozen.

It is still another object of the present invention to provide a device that prevents traffic collisions when driving over frozen or wet surfaces.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 shows an isometric view of the tire traction assembly 40, wherein the set of tension wheels 46 are mounted on a tire structure 44 that is deployed and retracted from the chassis 101 by means of a linear deployable mechanism 42, 42a.

DETAILED DESCRIPTION OF THE EMBODIMENTS OF THE INVENTION

Figure 1:
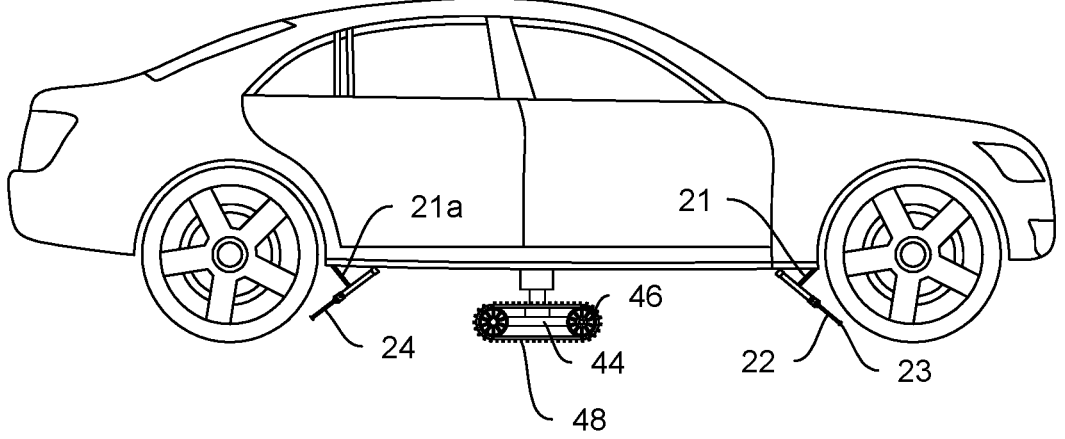
FIG. 1 represents a lateral view of the front piston 22, rear piston 24, and the tire traction assembly 40 being mounted under a vehicle's chassis 101.

Referring now to the drawings, where the present invention is generally referred to with numeral 10, it can be observed that it basically includes a anti-slip assembly 20, a tire traction assembly 40, an electronic assembly 60, and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 4:
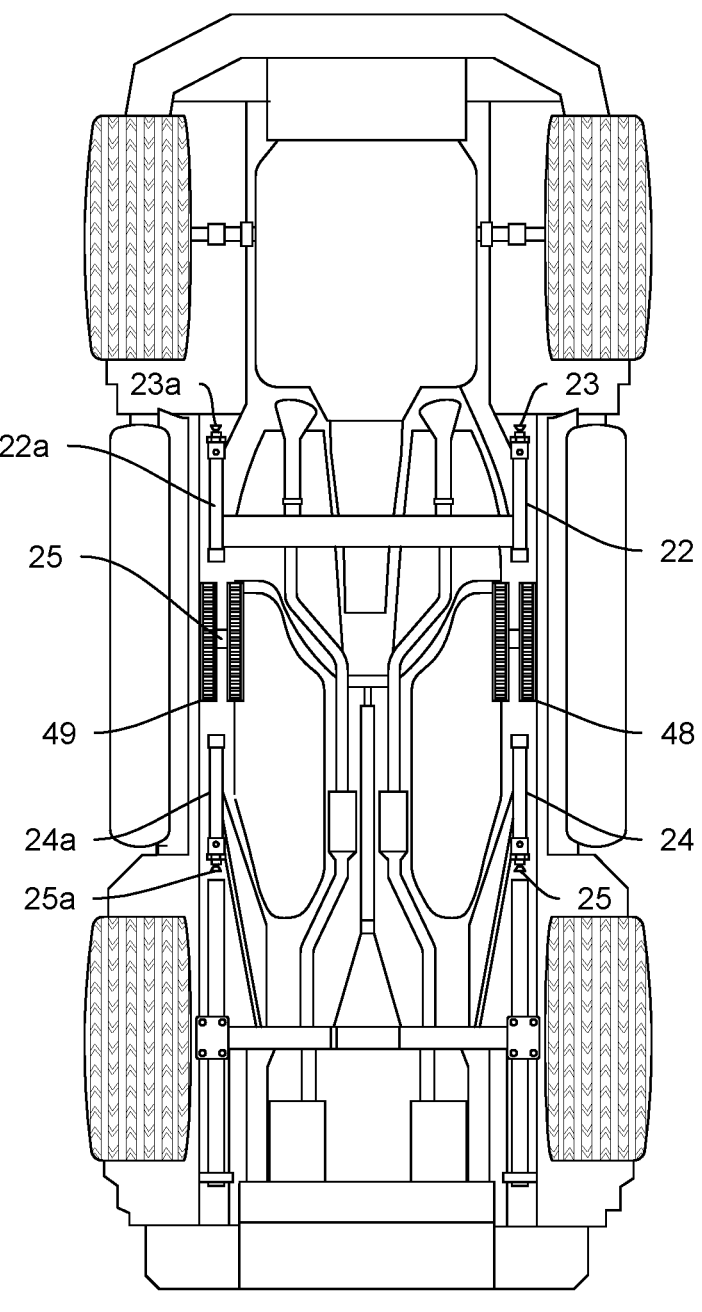
FIG. 4 depicts a bottom view of a vehicle where anti-slip assembly 20 and tire traction assembly 40 are coupled to prove a traction system when deployed.

Anti-slip assembly 20 includes a deployable mechanism 21, a front piston 22, a distal end 23, a rear piston 24, and a second distal end 25. In an exemplary embodiment, deployable mechanism 21 may be a device coupled to a portion of the vehicle's chassis 101, whereas the deployable mechanism 21 may be a suitable device that produces a linear motion such as an actuator, a piston, a linear motion mechanism or any other suitable device. It should be considered that deployable mechanism 21 may be coupled on a portion of the vehicle's chassis 101 near to the front tire thereof, wherein a second deployable mechanism 21a and a plurality of thereof may be coupled on a portion of the vehicle's chassis 101 near to each tire thereof. As FIG. 1 illustrates. In a suitable embodiment, front piston 22 may be a hydraulic piston or a pneumatic piston coupled on a portion of the vehicle's chassis 101, wherein deployable mechanism 21 is attached to a portion of the front piston 22, thereby the deployable mechanism 21 may provide the front piston a predetermined inclination towards the proximal vehicle's tire where is installed. As best depicted in FIG. 1. In a preferred embodiment, front piston 22 may include a plurality thereof 22a coupled at the opposite side of the vehicle's chassis 101 and the rear piston 24 may be coupled on a rear portion of the vehicle's chassis 101 and proximal to the rear vehicle's tire, wherein a plurality of rear piston 24a may be coupled at the opposite vehicle's side chassis 101 with respect to the rear piston 24. As best depicted in FIG. 4. It should be considered that the second deployable mechanism 21a and the plurality thereof may provide the same predetermined orientation to the rear piston 24 and the plurality thereof 22a, 24a. In one embodiment front piston and a plurality thereof 22, 22a includes said distal end 23 and a plurality thereof 23a respectively, wherein said distal ends 23, 23a are triangular members attached or integrally formed with each piston rod of said front pistons 22, 22a. In a preferred embodiment, the distal ends 23, 23a are made of steel, cast steel, Tungsten or any other suitable metal to abut against the pavement without breaking when the front pistons 22, 22a are actuated, thereby the distal ends 23, 23a are configured to provide a security means when the vehicle is parked, allowing ice to be broken during black ice by means of said distal ends 23, 23a to secure the vehicle in place. It should be considered that the second distal end 25 and a plurality thereof 25a are attached to the rear pistons 24, 24a as the front pistons 22, 22a to enhance vehicle's traction to the ground when parked in an inclined surface during black ice or frozen pavement.

Figure 3:
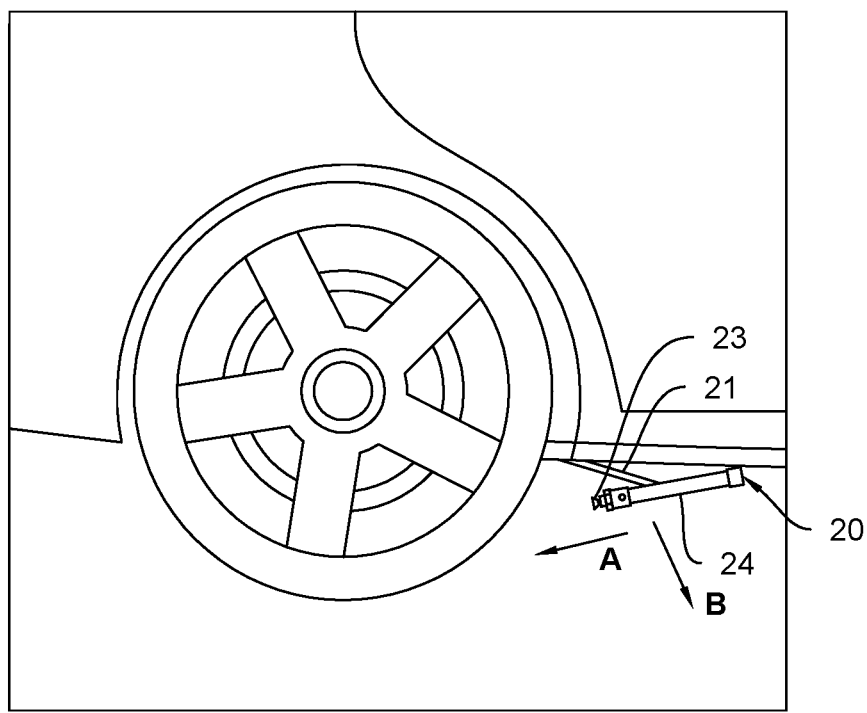
FIG. 3 illustrates a lateral view of the anti-slip assembly 20 in a retracted configuration and being coupled to a portion of the chassis 101.
Figure 3A:
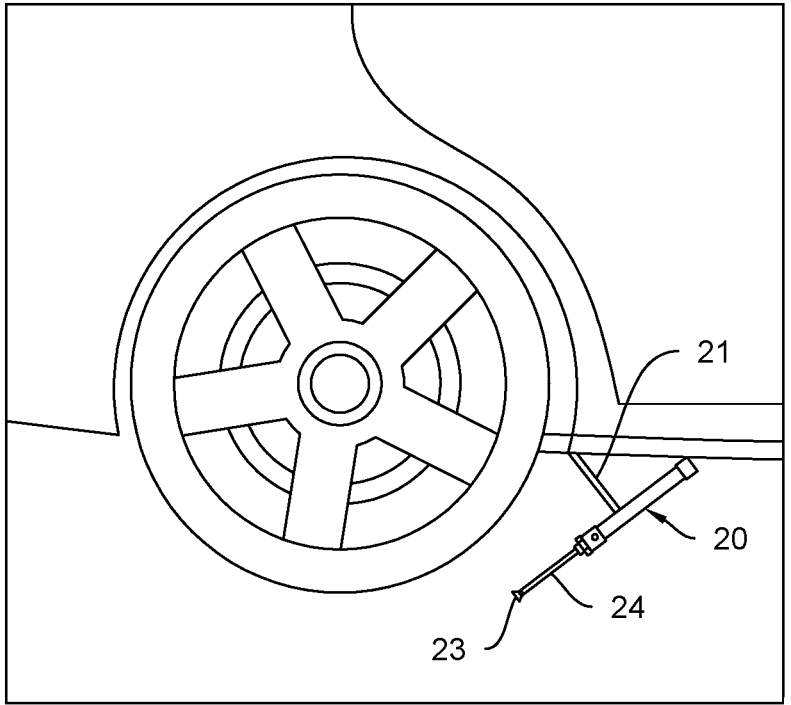
FIG. 3A is a representation of a lateral view of the anti-slip assembly 20 in an extended configuration, wherein the distal end 23 is configured to abut against a road surface.
Figure 3B:
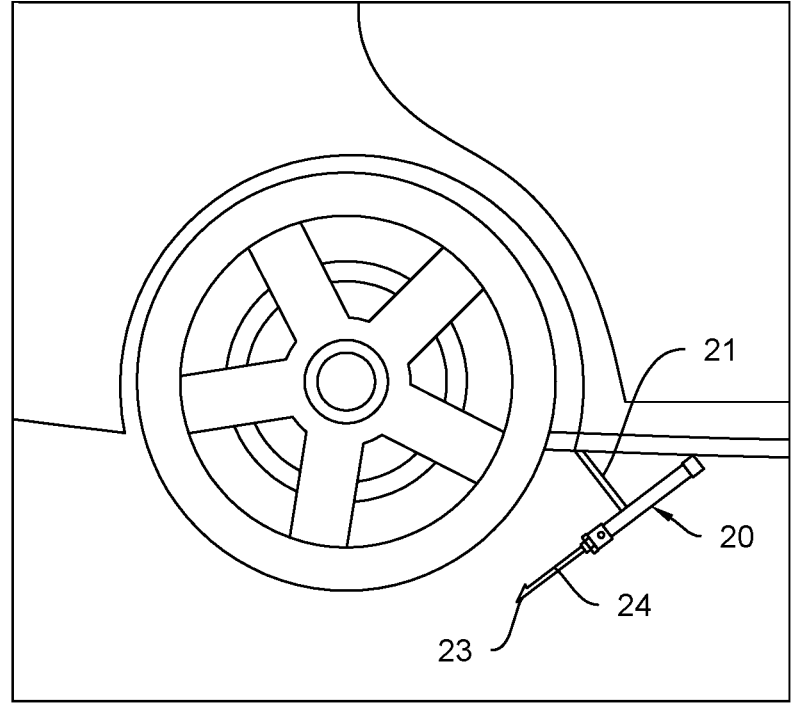
FIG. 3B demonstrates a lateral view of the view in a suitable variation of the distal end 23.

In a suitable variation, distal ends 23, 23a and second distal ends 25, 25a may be a half-triangle shaped end that allows the front and rear pistons 22, 24 to break an ice film formed onto the surface, thereby said distal ends 23, 23a and 25, 25a abuts against the pavement to help the vehicle to be secure in place. As FIG. 3B illustrates.

Figure 2:
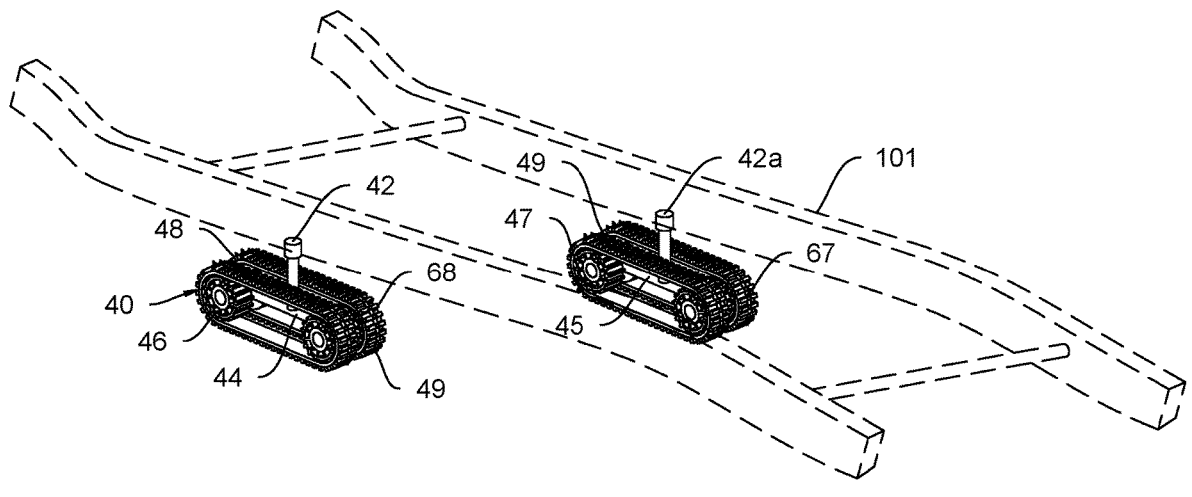

Tire traction assembly 40 includes a linear deployable mechanism 42, a tire structure 44, a set of tension wheels 46, a set of crawler belts 48, and traction peaks 49. In an exemplary embodiment, linear deployable mechanism 42 may be mounted on a portion of the vehicle's chassis 101 and between the front piston 22 and the rear piston 24. As FIG. 1 shows. In a suitable embodiment, linear deployable mechanism 42 may be a telescopic mechanism, a piston, a linear motion mechanism or any other suitable mechanism that allows the wheel's structure 44 to be extended towards the pavement and retracted towards the vehicle. In a suitable embodiment, wheel's structure 44 may be coupled to said linear deployable mechanism 42 as FIG. 2 represents, wherein wheel's structure 44 may be a tubular structure that allows the set of tension wheels 46 to be positioned in pairs and parallel oriented with respect to the vehicle's tires. The set of tension wheels 46 are made of hard plastic, carbon fiber, aluminum, steel, or any other suitable material that resists temperatures under freezing point and prevents from being damaged when rotating over the pavement. It should be considered for wheel's structure 44 may be made of square tubes, beams, or any other suitable structure that supports the set of tension wheels 46 when abutting against the pavement. In a preferred embodiment, the set of tension wheels 46 are mounted on the wheel's structure 44 by means of bearings or any other suitable device that allows the set of tension wheels 46 to have a rotational degree of freedom. It should be considered that the set of tension wheels 46 may include teeth along the circumference thereof to convey traction to the set of crawler belts 48 when rotating. As best depicted in FIG. 2. In one embodiment, the set of crawler belts 48 may comprise a crawler belt on each pair of wheels of the set of tension wheels 46. As FIG. 2 illustrates. In a suitable embodiment, the set of crawler belts 48 are made of rubber which traction peaks 49 are embedded along the circumference thereof, wherein traction peaks 49 may be tapered members attached made of steel, cast steel, alloy steel, Tungsten, or any other hard metal that allows the set of crawler belts 48 to provide traction or to broke ice formed on the surface on the pavement when the vehicle is moving, preventing the vehicle from slid. Traction peaks 49 may be attached to the set of crawler belts 48 in rows, lines, a disperse configuration or any other suitable configuration that covers the length thereof.

Figure 2A:
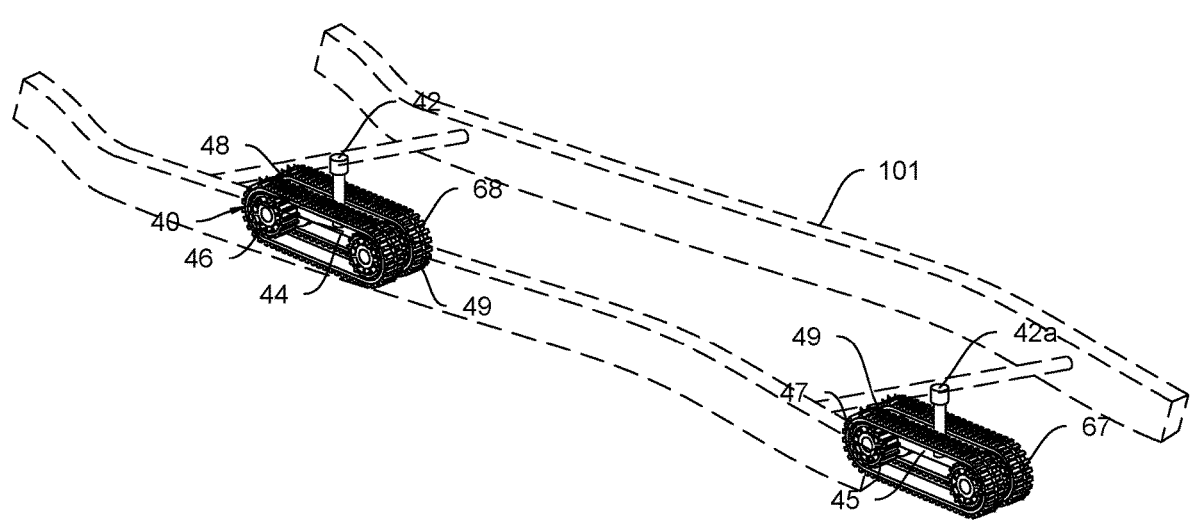
FIG. 2A depicts an isometric see-through view of the vehicle's chassis 101 when tire traction assembly 40 is coupled in a suitable variation thereof.
Figure 6:
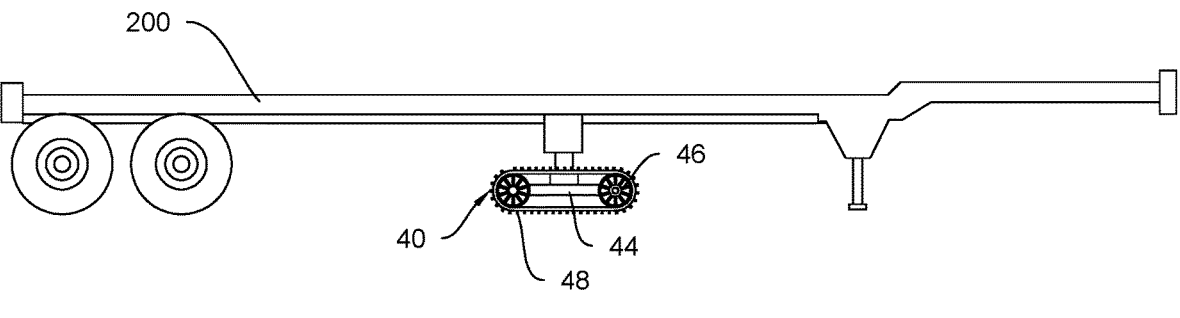
FIG. 6 shows a lateral view of a suitable variation of a trailer chassis 200, wherein tire traction assembly may be mounted.

Referring to FIG. 2, a tire traction assembly 40 further includes a second linear deployable mechanism 42a, a second wheel's structure 45, a second set of tension wheels 47, a second set of crawler belts 49, and a plurality of peaks 50 mounted as the same configuration and at the opposite side with respect to the linear deployable mechanism 42, tire structure 44, set of tension wheels 46, set of crawler belts 48, and traction peaks 49. In a suitable variation, FIG. 2A represents a suitable variation of the tire traction assembly 40 being coupled to the vehicle's chassis 101. Also FIG. 6 depicts a suitable variation of a chassis 101, wherein tire traction assembly 40 is capable of being mounted on a plurality of chassis 101 such as trailer chassis 200.

Figure 5:
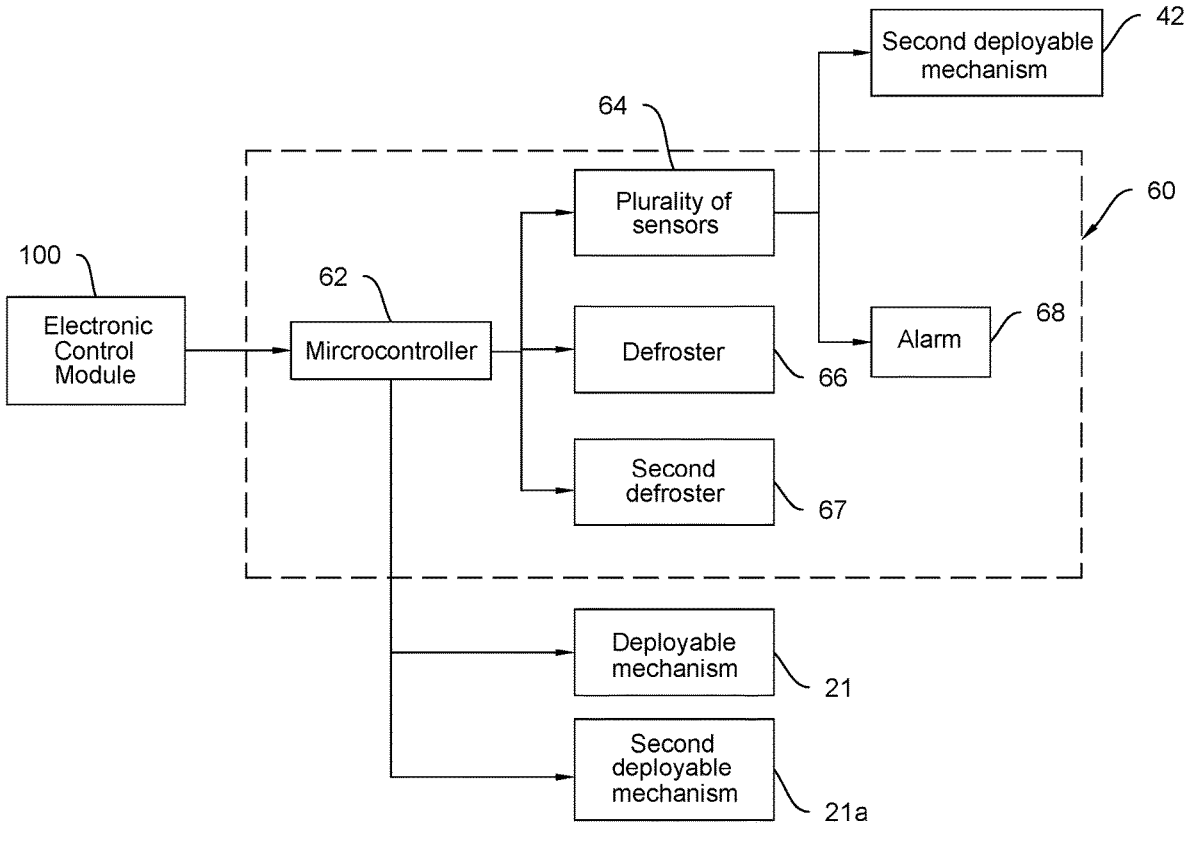
FIG. 5 illustrates a block diagram of the connection between the electronic assembly 60 to the vehicle's electronic control module 100.

Electronic assembly 60 includes a microcontroller 62, a plurality of sensors 64, a defroster 66 and an alarm 68. In an exemplary embodiment, microcontroller 62 may include data, memory and processors that process and receives instructions to control and monitor the plurality of sensors 64, the defroster 66 and the alarm 68, wherein the microcontroller is electrically connected to the Electronic Control Module 100 of the vehicle. In a suitable embodiment, the plurality of sensor 64 may be devices that produces an output signal for the purpose of sensing a physical phenomenon, such as freezing temperatures, skids and gyro sensors or the like, thereby the plurality of sensor 64 may include a skid sensor, a temperature sensor, or the like. In a preferred embodiment, the skid sensor of the plurality of sensors 64 may detect when the vehicle is sliding due to frozen pavement, thereby the linear deployable mechanisms 42, 42a may be deployed, allowing the vehicle to improve traction to the pavement by means of the traction peaks 49, 50 attached to the set of crawler belts 48, 49. In a preferred embodiment, defroster 66 may be a heated element made of fine wires running across the set of crawler belts 48, as FIG. 2 depicts, wherein the defroster 66 may be in contact with the traction peaks, thereby the defroster may allow the traction peaks 49 to be defrosted, preventing the traction peaks 49 to slide when deployed due to the frozen film formed around thereof caused by under freezing point weather. It should be considered that a second defroster 67 may be coupled to the second set of crawler belts 49 and electrically connected to the microcontroller 62, as best depicted in FIGS. 2, and 5 respectively. In one embodiment, alarm 68 may be an audible and/or visual device that warns the user when ambient freezing temperatures are detected. Alarm 68 also may alarm the user when the skid sensor deploys the tire assembly 40 when detecting skids of the vehicle. It should be considered that the anti-slip assembly 20 may be operatively connected to the Electronic Control Module 100, thereby the anti-slip assembly is deployed when the user parks the vehicle in an inclined street of road, allowing the front pistons 22, 22a and the rear pistons 24, 24a to abut against the pavement by means of the distal ends 23, 25 thereof to provide traction to the vehicle when parked on inclined and frozen pavement. It should be considered that the anti-slip assembly 20 may be deployed automatically when detecting the vehicle's parking configuration, nonetheless, the anti-slip assembly 20 may be deployed manually when the user considers appropriate.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

5

6

What is claimed is:

1. A tire traction with a brake system for frozen and wet pavement, comprising:

an anti-slip assembly including a front piston, a rear piston, a distal end, a second distal end, and a deployable mechanism, wherein front piston and rear piston are hydraulic, pneumatic or mechanical actuators coupled to a bottom portion of a vehicle's chassis, said front piston and said rear piston include said distal end and said second distal end respectively, wherein said distal end and said second distal end are configured to abut against a surface, wherein said deployable mechanism positions said front piston between a front and a rear wheel and at an oblique angle relative to said bottom portion of said vehicle's chassis towards the front wheel and said rear piston between the front and the rear wheel and at an oblique angle relative to said bottom portion of said vehicle's chassis towards the rear wheel to engage said surface at a non-perpendicular orientation, said deployable mechanism is a linear motion mechanism attached at said bottom portion of said vehicle's chassis, wherein a plurality of said front pistons and a plurality of said rear pistons are distributed across said vehicle's chassis, each front piston having a respective distal end attached thereto and each rear piston having a respective second distal end attached thereto, wherein said distal end, said second distal end and said plurality thereof are made of a hard material to break a film of ice formed onto said surface pavement; said linear deployable mechanism positions said set of crawler belts to extend longitudinally between said front piston and said rear piston; tire traction assembly having a linear deployable mechanism, wheel's structure, a set of tension wheels, a set of crawler belts, and traction peaks, wherein said linear deployable mechanism is a telescopic mechanism coupled at a portion of said vehicle's chassis, said wheel's structure is a structure that supports said set of tension wheels, wherein said wheel's structure is attached to said linear deployable mechanism, said set of crawler belts surrounds said set of tension wheels, wherein said set of crawler belts includes said traction peaks running across a length thereof, said traction peaks have a tapered end and are made of a hard metal material; and electronic assembly includes a microcontroller, a plurality of sensors, a defroster, and an alarm, wherein said microcontroller process data received from said plurality of sensors to actuate said anti-slip assembly and said tire traction assembly, said defroster is a heating element electrically connected to said microcontroller and coupled to said set of crawler belts, said alarm is an audible and/or visual alarm electrically connected to said microcontroller, said alarm is actuated when said plurality of sensors detects a physical phenomenon, including freezing temperature and/or vehicle skids, wherein said plurality sensors includes a skid sensor, a temperature sensor, and a gyro sensor, wherein said microcontroller processes data from said temperature sensor to detect ambient freezing conditions and actuate said defroster and said alarm, and wherein said microcontroller processes data from said gyro sensor to detect vehicle inclination and automatically actuate said anti-slip assembly.

2. A tire traction with a brake system for frozen and wet pavement, consisting of:

A) an anti-slip assembly including a front piston, a rear piston, a distal end, a second distal end, and a deployable mechanism, wherein front piston and rear piston are hydraulic, pneumatic or mechanical actuators coupled to a bottom portion of a vehicle's chassis, said front piston and said rear piston include said distal end and said second distal end respectively, wherein said distal end and said second distal end are configured to abut against a surface, wherein said deployable mechanism positions said front piston between a front and a rear wheel and at an oblique angle relative to said bottom portion of said vehicle's chassis towards the front wheel and said rear piston between the front and the rear wheel and at an oblique angle relative to said bottom portion of said vehicle's chassis towards the rear wheel to engage said surface at a non-perpendicular orientation for enhanced ice-breaking, said deployable mechanism is a linear motion mechanism attached at said bottom portion of said vehicle's chassis, wherein a plurality of said front pistons and a plurality of said rear pistons are distributed across said vehicle's chassis, each front piston having a respective distal end attached thereto and each rear piston having a respective second distal end attached thereto, wherein said distal end, said second distal end and said plurality thereof are made of a hard material to break a film of ice formed onto said surface; said linear deployable mechanism positions said set of crawler belts to extend longitudinally between said front piston and said rear piston;

B) tire traction assembly having a linear deployable mechanism, wheel's structure, a set of tension wheels, a set of crawler belts, and traction peaks, wherein said linear deployable mechanism is a telescopic mechanism coupled at a portion of said vehicle's chassis, said wheel's structure is a structure that supports said set of tension wheels, wherein said wheel's structure is attached to said linear deployable mechanism, said set of crawler belts surrounds said set of tension wheels, wherein said set of crawler belts includes said traction peaks running across a length thereof, are made of a hard metal material, said deployable mechanism includes a plurality thereof, wherein each of said deployable mechanisms are attached to said vehicle's chassis and further attached to each of said front piston, said rear piston and said plurality thereof, said set of tension wheels are coupled to said wheel's structure in pairs, forming an oval track profile, said tire traction assembly includes a plurality thereof installed on each side of said vehicle's chassis between the front side wheels and the rear side wheels thereof, wherein said plurality of tire traction assemblies are positioned symmetrically on each side of said vehicle's chassis with independent telescopic deployable mechanisms; and C) electronic assembly includes a microcontroller, a plurality of sensors, a defroster, and an alarm, wherein said microcontroller process data received from said plurality of sensors to actuate said anti-slip assembly and said tire traction assembly, said defroster is a heating element electrically connected to said microcontroller and coupled to said set of crawler belts, said alarm is an audible and visual alarm electrically connected to said microcontroller, said alarm is actuated when said plurality of sensors detects a physical phenomenon, including freezing temperature and vehicle skids, wherein said plurality sensors includes a skid sensor, a temperature sensor, and a gyro sensor, wherein said microcontroller processes data from said temperature sensor to detect ambient freezing conditions and actuate said defroster and said alarm, and wherein said microcontroller processes data from said gyro sensor to detect vehicle inclination and automatically actuate said anti-slip assembly said defroster is mounted around said set of crawler belts, wherein said defroster is in contact with said traction peaks, wherein said defroster encircles said set of crawler belts in direct thermal contact with said traction peaks, wherein said defroster includes a second defroster mounted on a second set of crawler belts of said plurality of tire traction assembly, providing redundant heating capability for fail-safe operation.

* * * * *